Oct. 6, 1936.　　　F. S. STREEVER　　　2,056,493

MUZZLE

Filed Aug. 30, 1935　　　2 Sheets-Sheet 1

Inventor
F. S. Streever

By Clarence A. O'Brien
Attorney

Oct. 6, 1936.  F. S. STREEVER  2,056,493
MUZZLE
Filed Aug. 30, 1935  2 Sheets—Sheet 2
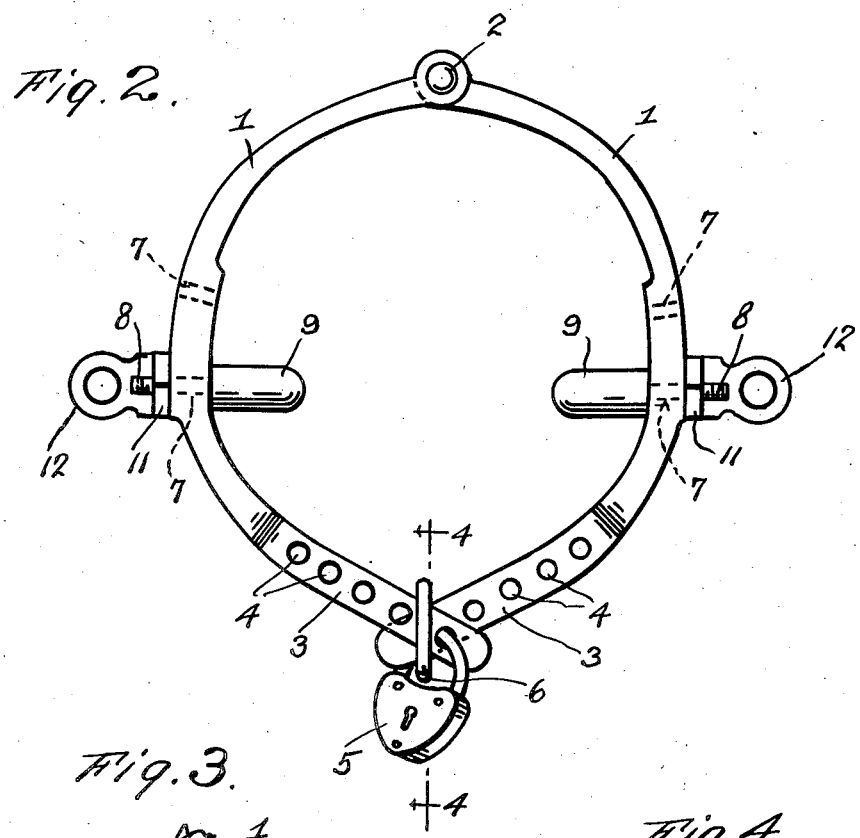
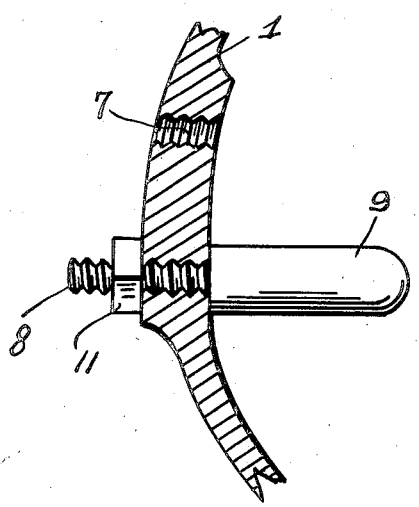
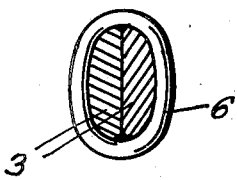
Inventor
F. S. Streever
By Clarence A. O'Brien
Attorney Patented Oct. 6, 1936

2,056,493

UNITED STATES PATENT OFFICE 2,056,493

MUZZLE

Frederick S. Streever, Ballston Spa, N. Y.

Application August 30, 1935, Serial No. 38,640

2 Claims. (Cl. 119—129)

The present invention relates to new and useful improvements in muzzles, particularly for dogs and has for its primary object to provide, in the manner hereinafter set forth, a device of this character which will positively prevent the animal from biting, seizing or tearing but which will interfere in no way with eating or drinking.

Another very important object of the invention is to provide a muzzle of the aforementioned character which includes novel means for retaining said muzzle in operative position on the animal.

Still another important object of the invention is to provide a muzzle of the character described for dogs and other animals which may be conveniently adjusted as desired.

Other objects of the invention are to provide a muzzle of the character set forth which will be comparatively simple in construction, strong, durable, highly efficient and reliable in use, compact, light in weight, comfortable and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in front elevation of the invention.

Figure 3 is a fragmentary view in vertical section through a portion of one of the segments, showing the mounting of one of the studs or bits.

Figure 4 is a vertical sectional view, taken substantially on the line 4—4 of Figure 2.

Figure 1:
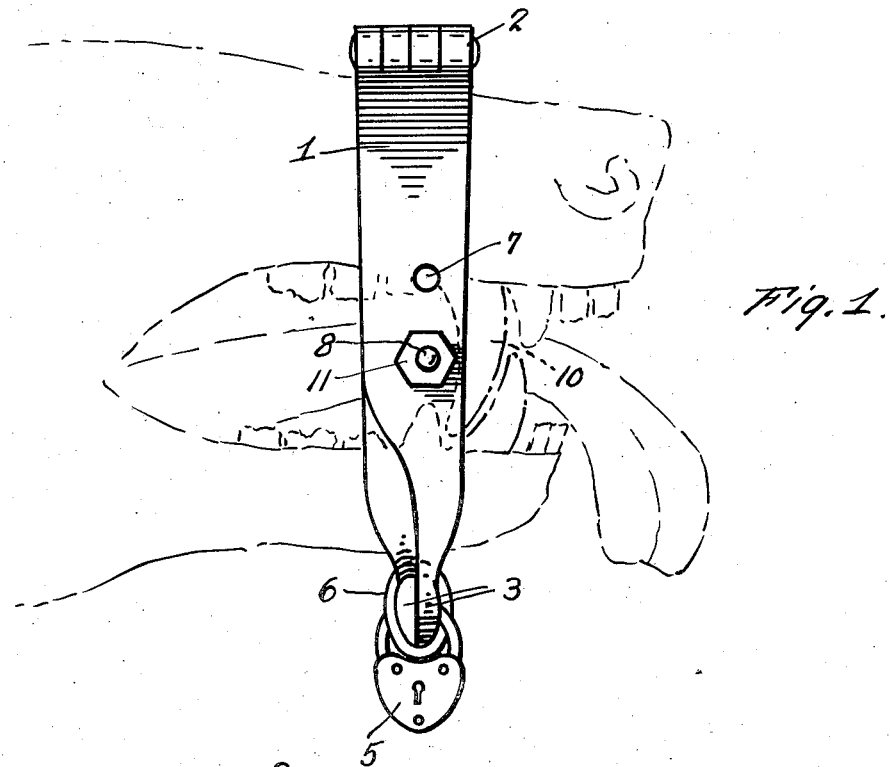
Figure 1 is a view in side elevation of a muzzle constructed in accordance with the present invention, showing the device applied to a dog.
Figures 5, 6:
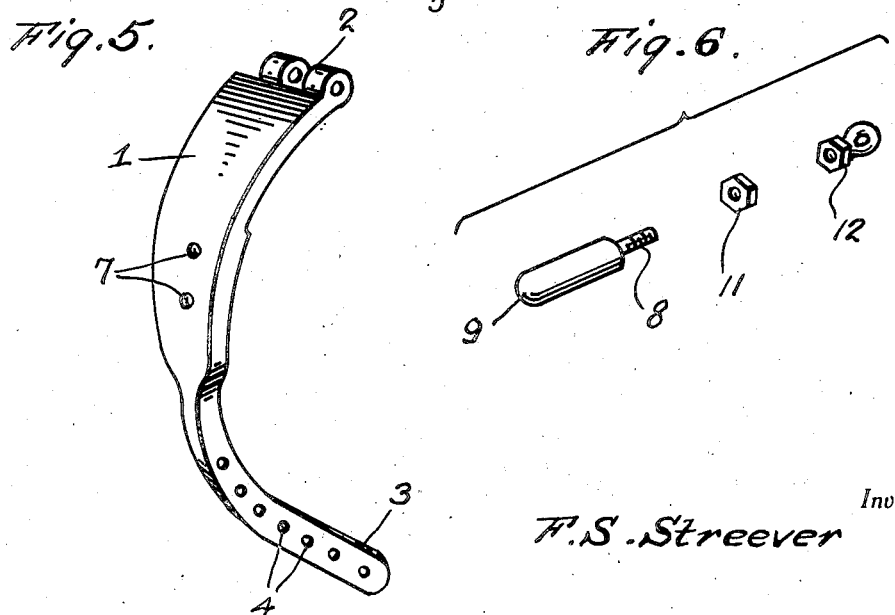
Figure 5 is a detail view in perspective of one of the segments.
Figure 6 is a perspective view of one of the studs or bits, its securing nut, and the eye which is mounted thereon, the elements being shown separated.

Referring now to the drawings in detail, it will be seen that the embodiment of the invention which has been illustrated comprises a pair of complemental segments 1 of any suitable material which, in conjunction with each other, are adapted to encircle the forward portion of an animal's head in the manner illustrated to advantage in Figure 1 of the drawings, said segments being hingedly connected above the animal's nose or muzzle, as at 2. At their free ends, the segments 1 terminate in crosssed tongues 3 having holes 4 therein which are adapted to be brought selectively into registry with each other for the reception of a suitable padlock 5. The tongues 3 extend slidably through a guide ring 6 which also strengthens the connection between said tongues.

The segments 1 have formed therein a plurality of threaded openings 7 for the reception of the reduced shanks 8 of a pair of studs or bits 9 which project inwardly from said segments and terminate in spaced relation to each other, said studs or bits being engageable behind the teeth 10 of the animal. The studs or bits 9 are adapted to be mounted selectively in the threaded openings 7, according to the adjustment that is desired. Securing nuts 11 are threaded on the shanks 8 for retaining the studs or bits 9 in position.

The shanks 8 project through the segments 1 and the securing nuts 11 for threadedly receiving eyes 12. The eyes 12 facilitate the attachment of a tether to the muzzle. Further, the eyes 12 serve as locks for the securing nuts 11.

It is thought that the manner in which the device functions will be readily apparent from a consideration of the foregoing. The invention is mounted on the animal's muzzle in the manner shown in Figure 1 of the drawings, the studs or bits 9 projecting into the mouth and from the sides thereof for engagement behind the teeth 10. The lower ends of the segments 1 are then adjusted as desired in the ring 6 and the padlock 5 is applied and the device is thus secured in position in a manner to positively prevent removal. The muzzle, when it is applied, is adjusted to permit the jaws of the animal to be opened sufficiently for eating or drinking but not wide enough to permit biting, seizing or tearing. Further, the spaced studs or bits 9 permit freedom of movement of the animal's tongue therebetween, another highly desirable feature. Of course, the device may be conveniently removed by authorized persons by simply inserting the proper key into lock 5 and opening the segments 1 in a manner to withdraw the studs or bits 9 from the animal's mouth.

It is believed that the many advantages of a muzzle constructed in accordance with the present invention will be readily understood, and although a preferred embodiment of the invention is as illustrated and described, it is to be understood that changes in the details of construction and in the combination and arrangement of the parts may be resorted to which will fall within the scope of the invention as claimed.

What is claimed is:

1. A muzzle comprising a pair of complemental segments adapted to encircle the muzzle and jaws of an animal, said segments being hingedly connected at one end, bits projecting inwardly from intermediate portions of the segments and engageable behind certain of the teeth of the animal, said bits terminating in spaced relation to each other, and means for adjustably connecting the free ends of the segments together, said means including crossed tongues projecting from the free ends of the segments and having openings therein adapted to be brought into registry for the reception of a connecting device, and a ring slidably encircling said tongues substantially at the point where said tongues intersect.

2. A muzzle comprising a substantially ring shaped member adapted to encircle the muzzle and jaws of an animal, bits mounted on the inner periphery of the side portions of said member and projecting inwardly therefrom for engagement behind certain of the animal's teeth, said bits including reduced shanks extending through the member and projecting from the outer periphery thereof, securing nuts threaded on said shanks and engaged with the member, and eyes threaded on said shanks and engaged with said securing nuts.

FRED. S. STREEVER.